United States Patent [19]

Faxas

[11] 4,005,805
[45] Feb. 1, 1977

[54] SINGLE OR MULTIPLE FURROW SUGAR CANE PLANTING MACHINE

[76] Inventor: Juan Sebastian Faxas, P.O. Box 1122, Clewiston, Fla. 33440

[22] Filed: Aug. 19, 1975

[21] Appl. No.: 600,610

[52] U.S. Cl. .............................. 222/178; 198/863; 222/226; 214/83.26; 111/2

[51] Int. Cl.² .......................................... A01C 15/00

[58] Field of Search ........... 222/178, 226; 198/233, 198/118, 120, 120.5, 126; 214/83.26, 520; 111/2, 3

[56] References Cited
UNITED STATES PATENTS

| | | | |
|---|---|---|---|
| 2,503,129 | 4/1950 | Pautz | 214/520 |
| 3,286,858 | 11/1966 | Julien | 214/83.26 |
| 3,344,830 | 10/1967 | Longman | 111/3 |
| 3,444,913 | 5/1969 | Arceneaux, Sr. | 111/3 |

*Primary Examiner*—Stanley H. Tollberg
*Assistant Examiner*—Hadd Lane

[57] ABSTRACT

This is a machine for planting one or more rows of sugar cane. It consists of a trailer which contains a supply of pre-cut seed cane, a bed designed to support the cane and place it on the conveyors and several conveyors which carry the seed cane and discharge it into pre-plowed furrows.

6 Claims, 2 Drawing Figures

TOP VIEW

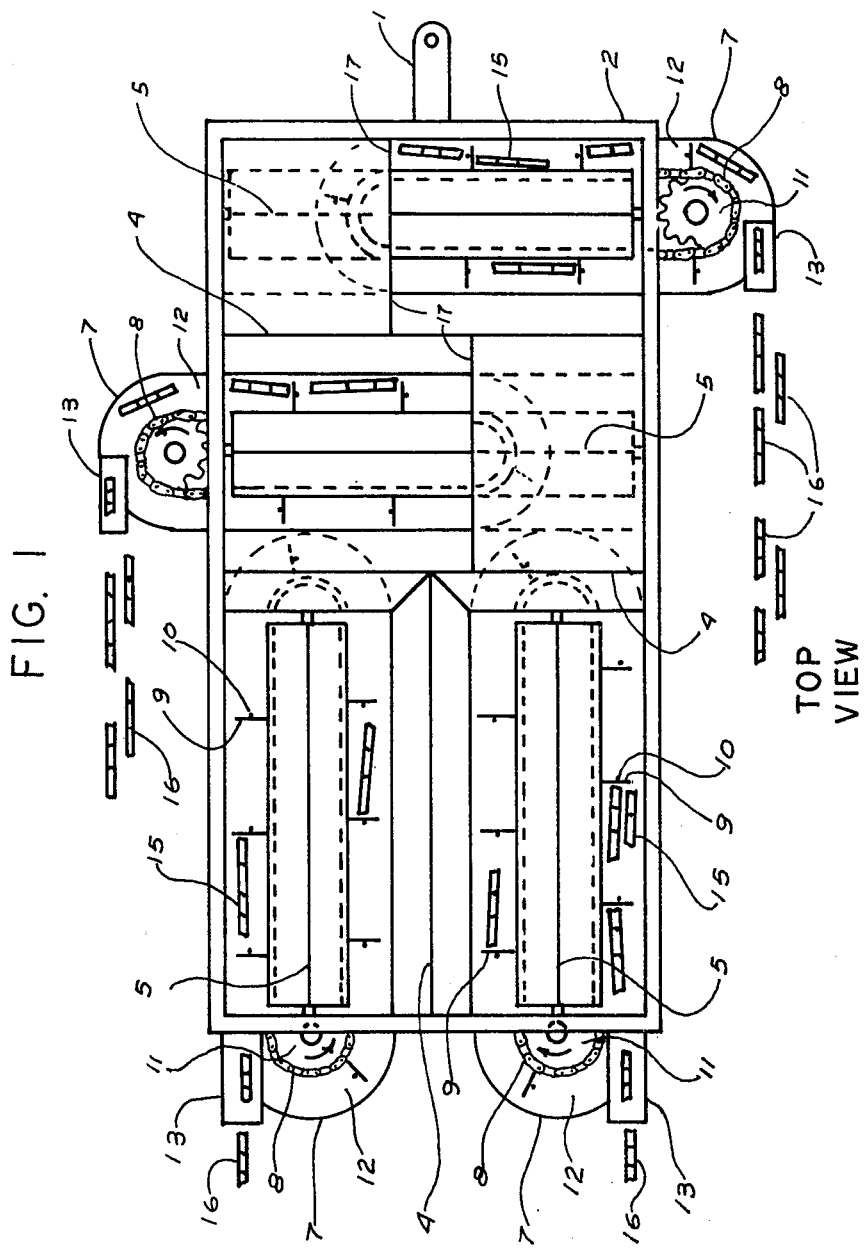

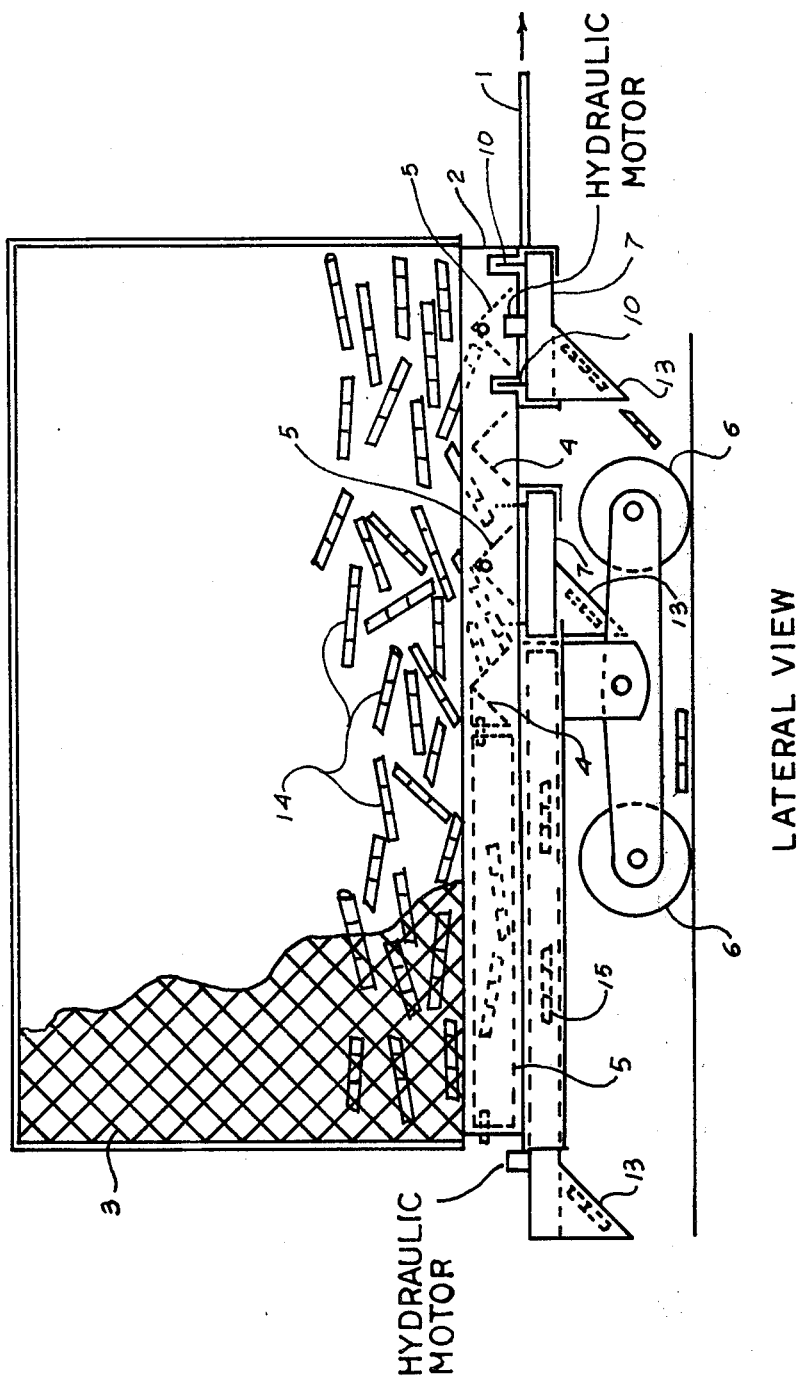

SINGLE OR MULTIPLE FURROW SUGAR CANE PLANTING MACHINE

This invention relates to a device for planting one or more rows of sugar cane. Sugar cane is presently planted by hand by workers following a trailer carrying large pieces of seed cane. The workers place them in furrows where they are cut by hand and are later covered. The lack of mechanization makes this procedure very labor intensive.

My invention has two basic parts. The first is a bed formed by angular bars (some fixed and others mobile) which both support the cane and let it pass between them onto the cane conveyors. The second is the cane conveyors which receive the cane in allignment, transport it and let fall into the furrows at convenient intervals.

The bed and conveyors can be mounted on a trailer. Above the bed will be the container space of the trailer which will carry the precut pieces of seed cane. The trailer can be pulled by a tractor which will provide power for the can conveyors and the vibrators which move the angular bars of the bed to assist in the allignment of the seed cane.

The primary objective of the invention is to provide a means of mechanizing the planting of seed can which is presently planted by hand. Here this is accomplished using a trailer which contains supply of pre-cut seed cane, a bed designed to support the cane and place it on the conveyors and several conveyors which carry the seed cane and discharge it in allignment into pre-plowed furrows.

A further objective is to plant pre-cut pieces of seed cane approximately 18 inches long. The present procedure is to plant long pieces about 6 to 8 feet long which are then cut to the 18 inch length by workers following the trailer. Because the invention plants the pre-cut pieces, workers are not required to cut the cane in the field.

A still further objective of the present invention is that it will be able to plant several furrows of cane at the same time.

A still further objective is that the planter does not damage the seed cane because the weight of the cane rests on the angular bars and falls a little at a time onto the conveyors.

A still further objective is that the conveyors be extendable and retractable. This is necessary so that the planter can plant more furrows, so that adjustments can be made to furrows of different widths and so that the machine can be easily adjusted to meet the 8 foot maximum width for operation on highways.

With these objectives presented, the invention is more fully described hereinafter and more particularly pointed out in the claims appended hereto.

In the accompanying drawings like symbols refer to like or corresponding parts throughout the several views:

FIG. 1 is a top view of the planter adapter to planting 4 cane rows simultaneously. This figure shows both the angular bars and the drawer like conveyors.

FIG. 2 is a lateral or side view which shows more clearly the construction of the trailer and the placement of the angular bars.

THE VEHICLE AND THE CONTAINER

In FIG. 1 and FIG. 2 it can be seen that the mechanisms for planting the cane are mounted on a trailer. The trailer can be attached to the tractor by means of the hitch 1. Associated with the hitch will be the means of transferring the power from the tractor to the trailer. The frame of the trailer 2 can be made out of iron and the angular bars welded over it. The sides of the trailer 3 form the container for carrying the seed cane and can be made out of iron frames and covered with a metal mesh, bars or metal plate. The trailer wheels 6 are shown in FIG. 2. The trailer may have four (4) or more wheels.

THE BED

The bed is formed by an iron frame above which are fastened angular bars with the ridge upwards and with each wing about 12 inches wide (4 and 5 in FIG. 1 and FIG. 2). The bed supports the seed cane, and helps to allign it so it falls on the conveyors below. In the forward section the angular bars lay cross-wise, while in the rear section they are parallel to the sides. In each section the angular bars in the center 4 are immobile, while those on the sides 5 are mounted on axes and moved mechanically or by vibrators which gives the angular bars a light swinging motion. The angular bars are placed at a distance of about 24 inches from ridge to ridge. Both the inclined planes of the angular bars and the vibrations of those mounted on axes will facilitate the slipping of the seed cane 14 onto the conveyors.

To keep the cane from falling through the bed in those sections which do not have conveyors directly below, metal plates 17 can be used as covers.

THE CONVEYORS

The conveyors are formed in the shape of drawers (conveyor drawers 7) the outside dimensions of which will be about two feet six inches wide and eight feet long. The frame will be open at one end and there the metal bed will be lowered to form the discharge canal of the conveyor 13. The conveyors lie below the bed of angular bars, the two in the front being in a transversal position will be pushed out to their working positions by a hydraulic piston. These are the conveyors which will plant the outside furrows. The conveyors of the rear section are parallel to the sides of the trailer and will be used to plant the middle rows.

Centered within each conveyor drawer is a conveyor chain 8 which works in a horizontal position. Each chain may be run by a hydraulic motor which receives its pressure from the pump of the tractor. The power passes through sprocketed conveyor wheels 11 to the chains. Approximately each 24 inches along the chain there is a small metal partition 9 that helps to push along the pieces of cane. Attached to each partition is mounted a flexible finger 10 in a vertical position. The flexible fingers function is to help allign the seed cane so it both falls onto the conveyors and falls in correct allignment. The pieces of cane 15 then pass along the conveyor canal 12 to the discharge canal of the conveyor 13. Passing through the discharge canal they finally fall in allignment into the furrow 16.

What is claimed as new is as follows:

1. A seed cane planter comprising a wheeled frame, having an upper container for canes to be planted and a lower compartment containing a plurality of conveyors, each of said conveyors being mounted for movement between a first position within the outline of the frame and second position extending from a feed end below the container to a discharge end beyond the frame and above an adjacent furrow, and spaced bars at the bottom of said container at the feed ends of said conveyors in the second position, said bars being aligned with the conveyors, so that the seed cane falls on each of said conveyors with their axes parallel to the axis of the conveyor.

2. The planter of claim 1 wherein the bars are angled bars fastened with their ridges upward in the region of said feed ends when the conveyors are in their second positions.

3. The planter of claim 1 wherein at least some of said bars have vibratory means to assist the seed cane to orient itself to parallelism with the bars.

4. The planter of claim 1 wherein said conveyors are chain conveyors with metal partitions and flexible fingers extending therebetween, to assist the seed canes into alignment with the bars as they fall onto the conveyor in said second position.

5. The planter of claim 1 wherein the conveyors may be independently extended to varying positions, to vary the number and width of the furrows to be planted.

6. The planter of claim 1 wherein the conveyors are independently driven by hydraulic motors.

* * * * *